(12) United States Patent
Sakai et al.

(10) Patent No.: US 6,750,283 B1
(45) Date of Patent: Jun. 15, 2004

(54) HIGH-HARDNESS, SOFT COMPOSITE MATERIAL

(75) Inventors: Mieko Sakai, Tokyo (JP); Kenichiro Saito, Chiba (JP)

(73) Assignee: Doppel Co., Ltd., Tokyo (JP)

( * ) Notice: Subject to any disclaimer, the term of this patent is extended or adjusted under 35 U.S.C. 154(b) by 0 days.

(21) Appl. No.: 09/830,060

(22) PCT Filed: Oct. 22, 1999

(86) PCT No.: PCT/JP99/05843

§ 371 (c)(1), (2), (4) Date: Jul. 23, 2001

(87) PCT Pub. No.: WO00/23524

PCT Pub. Date: Apr. 27, 2000

(30) Foreign Application Priority Data

Oct. 22, 1998 (JP) .......................................... 10-300576

(51) Int. Cl.⁷ ................................................. C08K 3/34
(52) U.S. Cl. ........................ 524/492; 524/442; 524/449; 524/448
(58) Field of Search ................................ 524/492, 494, 524/437; 525/35, 36, 43, 222, 227

(56) References Cited

U.S. PATENT DOCUMENTS

| 5,530,064 A | * | 6/1996 | Ashton et al. | ............... | 525/102 |
| 5,882,560 A | * | 3/1999 | Ittmann et al. | ............... | 264/122 |
| 6,177,179 B1 | * | 1/2001 | Schock et al. | ............... | 428/218 |
| 6,432,329 B1 | * | 8/2002 | Cohen | ........................... | 264/6 |

FOREIGN PATENT DOCUMENTS

| JP | 60-84364 | 5/1985 |
| JP | 60-245661 | 12/1985 |
| JP | 3-271145 | 12/1991 |
| JP | 11-106643 | 4/1999 |
| WO | 9310183 | 5/1993 |

\* cited by examiner

*Primary Examiner*—Katarzyna Wyrozebski
(74) *Attorney, Agent, or Firm*—Wenderoth, Lind & Ponack, L.L.P.

(57) ABSTRACT

A high-hardness, soft composite material which consists of an organic/inorganic composite material having at least 60 wt. % of inorganic components including an aggregate component, and which has a surface Vickers hardness (JIS Z 2244) of at least 400 and a radius of curvature, at which the material is bendable without being broken, of at least R25 mm based on a platy body 3 to 15 mm thick, the organic/inorganic composite material being high in surface hardness, soft and bendably worked.

16 Claims, 1 Drawing Sheet

HIGH-HARDNESS, SOFT COMPOSITE MATERIAL

This application is a 371 application of PCT/JP99/05843 filed Oct. 22, 1999.

BACKGROUND OF THE INVENTION

1. Field of the Invention

The present invention relates to a high-hardness, soft composite material. More specifically, it relates to a novel high-hardness, soft composite material having a large surface hardness so as to provide the excellent wear resistance and damage resistance as well as a softness so as to provide a deformability easily acclimated to the ground, and the excellent processability, useful as a natural stone-like construction material, civil engineering material, or the like.

2. Description of the Related Art

Conventionally, soft composite materials made from a resin, or a resin and an inorganic filler and a pigment added thereto, have widely been used for a wall or a ceiling of a building, a furniture material, or the like. Since these resin composite materials are a resin-based soft material, they can easily be divided, the material can be thinned, they can easily be bent, and easily be acclimated to the base material, and thus they are indispensable as a construction material or civil engineering material with the excellent processability.

However, all of these soft materials commonly known, such as a vinyl chloride sheet, a vinyl chloride tile, and a P tile, have a low surface hardness, and substantially no wear resistance and damage resistance. Therefore the purpose of use, application, or the like have been extremely limited. Moreover, these soft materials can easily be recognized as a plastic at one glance. Even in the case toning or patterning is applied by including a pigment or a filler, the texture is limited inevitably as a plastic.

Therefore, a problem is involved in that they cannot be used for the floor and the passage, where abrasion and damage cannot be avoided, and a part requiring a high class feeling and a designing property. Moreover, since the conventional materials have a poor climate resistance and a large coefficient of thermal expansion, a problem arises in that they cannot be used outdoor.

In contrast, natural stone-like resin composite materials have been used practically as a material with a higher surface hardness and a high class feeling. However, since the conventional hard materials lack the above-mentioned characteristics of the soft materials, the processability, or the like is greatly limited. Moreover, although they are natural stone-like, most of them are recognized as a resin or a plastic in the texture, and thus as the actual situation, it is far from the texture of the natural stones.

SUMMARY OF THE INVENTION

Accordingly, in order to overcome the above-mentioned conventional technological limit, an object of the present invention is to provide a high hardness, soft composite material useful as a novel construction material, civil engineering material, or the like, having a high surface hardness, the excellent wear resistance and damage resistance, a depth and a high class feeling, without ruining the advantages of the soft resin based composite material including a thinness, difficulty in cracking, and an easy processability.

A first aspect of the present invention is a high hardness, soft composite material which consists of an organic/inorganic composite material having at least 60% by weight of inorganic components including an aggregate component, and which has a surface Vickers hardness (JIS Z 2244) of at least 400 and a radius of curvature, at which the material is bendable without being broken, of at least R25 mm based on a platy body having a 3 to 15 mm thickness.

A second aspect of the present invention is the composite material, wherein the radius of curvature R is 25 to 1,000 mm.

Moreover, a third aspect of the present invention is the first or second aspect, wherein the inorganic components comprise an aggregate component of a 2 to 70 mesh size, and a fine particle component of a small particle size of 100 mesh or smaller.

A fourth aspect of the present invention is the composite material, wherein the weight ratio of the aggregate component and the fine particle component is (aggregate component/fine particle component)=1/10 to 10/1.

A fifth aspect of the present invention is the composite material, wherein the organic component is contained by 40% by weight or less with respect to the total amount.

A sixth aspect of the present invention is the composite material, wherein the main component of the organic component is a curing type resin.

A seventh aspect of the present invention is the composite material, wherein the main component resin of the organic component is a methacrylic based resin.

An eighth aspect of the present invention is the composite material, wherein a plasticizer is contained as the organic component.

A ninth aspect of the present invention is the composite material, wherein the resin component is contained by 6 to 15% by weight with respect to the total amount.

A tenth aspect of the present invention is the composite material, wherein a transparent component is contained at least as a part of the aggregate component.

An eleventh aspect of the present invention is the composite material, wherein a transparent component with the surface covered with a pigment component is contained at least as a part of the aggregate component.

A twelfth aspect of the present invention is the composite material, wherein a luminous material or a fluorescent material is contained.

A thirteenth aspect of the present invention is the composite material, wherein a flame retarder is contained.

A fourteenth aspect of the present invention is the composite material, wherein a pigment for coloring is contained in the organic component.

A fifteenth aspect of the present invention is the composite material, wherein an antibacterial agent is contained.

A sixteenth aspect of the present invention is the composite material, wherein the surface of a compact is treated by polishing, a water jet process, or a water jet process after polishing.

A seventeenth aspect of the present invention is the composite material, wherein the main component of the organic component is the methacrylic based resin, to be cured by a combination of a polymethacrylate and at least one selected from the group consisting of a methacrylate monomer, and an acrylate monomer.

An eighteenth aspect of the present invention is the composite material, wherein the polymethacrylate is a polymethyl methacrylate (PMMA), the methacrylate monomer and the acrylate monomer is one selected from the group consisting of a methyl methacrylate, an ethylhexyl methacrylate, and an ethylhexyl acrylate.

A nineteenth aspect of the present invention is the composite material, wherein a force needed for a bending process of a platy body having a 3 to 15 mm thickness is 1 kgf/cm² or less.

DESCRIPTION OF THE PREFERRED EMBODIMENTS

Figure 1:
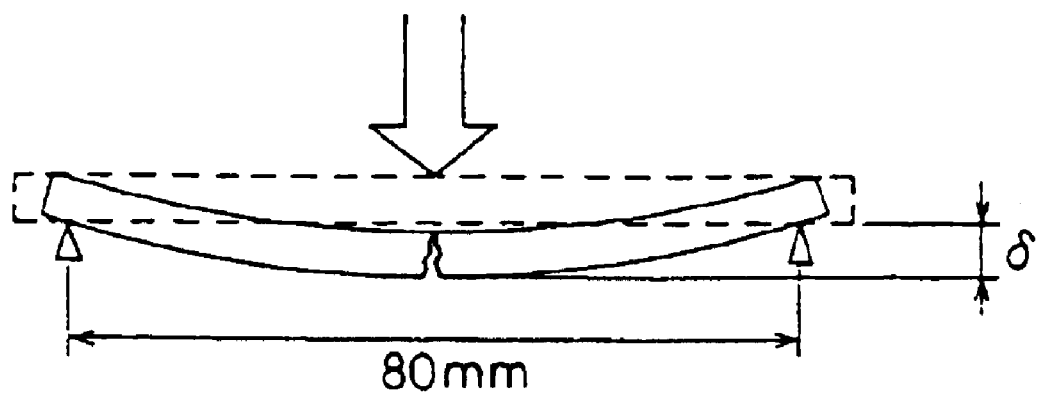
FIG. 1 is a schematic diagram showing a measuring method for a limit deflection amount.

The present invention is significant in terms of providing a natural stone-like composite material having characteristics of a high hardness and a softness, which contradict with each other, the excellent physical chemical properties as a construction material or a civil engineering material, a depth and a high class feeling.

The composite material according tot he present invention includes as the basic composition:

(I) an inorganic component including an aggregate component (60% by weight or more, more preferably 80% by weight or more), and (II) a resin component (40% by weight or less, more preferably 20% by weight or less).

A high hardness, soft composite material according to the present invention is specified by at least any of the following items.

The surface hardness thereof is a surface Vickers hardness (JIS Z 2244) of at least 400 and a radius of curvature, at which the material is bendable without being broken, of at least R25 mm based on a platy body having a 3 to 15 mm thickness.

As to the above-mentioned item, the Vickers hardness is preferably 1,000 or more, further preferably 1,200 or more.

The composite material according to the present invention is remarkable as natural stone-like one having a high hardness and a softness, and a depth and a high class feeling. As to the composition thereof, the above-mentioned (I) inorganic component containing an aggregate component can be classified into the aggregate component and other inorganic components such as a filler. Here, the aggregate component is an indispensable component for having a higher surface hardness of the composite material according to the present invention. As the aggregate component, various kinds of ceramics and metal small particles such as a natural stone or an ore including a granite, a marble, a metamorphic rock, a quartz, a feldspar, a mica, or the like, a molten silica, a glass, a metal, and a pottery can be presented as representative examples.

Moreover, as the other inorganic materials, a filler, a pigment, and a luminous material to be described later, or the like, can be considered. As representative examples of the filler component, a calcium carbonate, an aluminum hydroxide, or the like can be presented.

The inorganic small particle component as the aggregate component further preferably has a 2 to 70 mesh (Tyler reference) size. The other inorganic component such as a filler is preferably a further finer particle of a 100 mesh (Tyler reference) or less. The small particle aggregate component of, for example, a natural stone functions as a principal factor for the external appearance and the physical nature of the man-made stone to be obtained. In particular, by partial exposure, it will serve as the principal factor for the color and the pattern on the external appearance in combination with the other components.

The above-mentioned fine particle component, which is considerably finer than the 100 mesh level compared with the small particle aggregate component, enters between particles of the small particle aggregate component so as to be disposed, filling the space among the particles for contributing to obtainment of the natures of the man-made stone to be obtained, such as solidness and flexibility. The weight ratio of the small particle aggregate component and the fine particle component is preferably 1/10 to 10/1. As mentioned above, the size of the inorganic small particle aggregate component is preferably the above-mentioned specified size of 2 to 70 mesh. Except for a special case, it is preferable to use only those with the same size. In the case of, for example, having the color thicker to the upper direction or lower direction by using those with a color and without a color, it is conceivable to use small particles with different sizes, depending on the existence or absence of the color. However, since use of those with an extreme difference in a large quantity deteriorates the strength of a product, it is not preferable.

The size of the particles of the fine particle component is, as mentioned above, a 100 mesh or under. It should be sufficient for allowing entrance among particles of the small particle component. Therefore, those having a size close to the size of particles of the small particle component are not preferable. More specifically, those having about a 150 to 250 mesh are preferable.

The resin component according to the present invention contributes to wrapping the small particle component such as a natural stone and the fine particle component, which form the above-mentioned aggregate for bonding the entirety so as to provide the function of providing an elasticity or a tensile strength to a product when a man-made stone is completed.

In the present invention, the constituent ratio of these components is important. Particularly important is the constituent ratio of the resin component and the other component. For example, in the present invention, a high density product having a dense structure can be provided.

With a larger constituent ratio of the small particle component such as a natural stone as the aggregate component in a product, one closer to a natural stone can be provided. However, if it is too large, the particles cannot be solidified, and thus cannot be used as a product. Moreover, the physical property of the product to be obtained becomes poor so that it cannot be provided for an ordinary use.

Furthermore, also in the case of using the fine particle component in a large amount, a problem of inability of solidification is generated. Besides, since a product to be obtained does not have gloss, it cannot look like a stone.

Therefore, the ratio of the amount of the total sum of the small particle aggregate component and the fine particle component should be 60% by weight or more, preferably 80% by weight or more based on the total amount of the composite material according to the present invention. With a 95% or more ratio, the product becomes vulnerable, and thus only one inconvenient for use can be obtained. Moreover, with a less than 60% or less ratio, the product becomes so soft that a stone-like property cannot be obtained, and thus the application range is limited to the range of a resin plate.

This means that the components other than the small particle aggregate component such as a natural stone and the fine particle component, that is, the resin component should not be included more than 40% by weight based on the total amount in the product.

With about a more than 40% by weight ratio of the resin component, the product becomes like a plastic so that it is only a superficial man-made stone. Moreover, if the resin component is provided by an extremely small amount, although it contributes to the external appearance property of the product close to a natural stone on one side, the product becomes vulnerable so that it cannot be appropriate for use.

In the case of providing a high density man-made stone, in the present invention, the resin component ratio is preferably 20% by weight or less based on the total amount.

Furthermore, in the resin-inorganic composite material according to the present invention, a part or the entirety of the above-mentioned inorganic small particle aggregate component may be transparent particles, or particles or small lumps thereof covered with an inorganic or organic substance.

These transparent small particle aggregate component or the component particles with the surface covered are important for the following reasons.

It is related to the target tone and design of the composite material according to the present invention. The granite and the marble are often be the target for their difficulty of obtaining natural products, and their beautiful color and gloss. In this case, the color and gloss are important themes for determining the values of the granite and the marble. In the natural granite and marble, the color itself varies widely from those with black colors to white colors, or red colors. Besides, even in the case of those with the same color, the degree thereof differs.

In the conventional technique, in the case of providing a color to various kinds of man-made stones, for example, for obtaining a black one, only black powdery substance of a natural stone, or the like can be used. However, in order to obtain one with an intermediate tone, the reproductivity is critical. Moreover, even if a color can be provided, it has been difficult to provide the gloss peculiar to the marble. For example, even in the case of providing a color, using a dye or a pigment, it has been difficult to provide gloss or a depth conventionally.

In contrast, according to the present invention, a transparent small particle aggregate component can be used. For example, in the case of obtaining granite-like or marble-like products with gloss, small particles obtained by pulverizing a quartz based natural stone can be used. Since the material of the small particle aggregate component obtained by pulverizing a quartz based natural stone is a quartz, it has a unique smooth part on the surface. Moreover, in most cases, it is colorless and transparent. Even in the case it has a color, it is not so strong, and even in the case it is not transparent, it often has a transparent property to some extent.

By using the material, the color of the product composite material to be obtained can be controlled as well as the color can be provided with a depth and gloss owing to the existence of the transparent quartz based small particle component.

The transparent small particle aggregate component is provided as a quartz based silica rock, a glass powder, or the like. The ratio thereof in the entire small particle aggregate component can be 10 to 100% by weight.

Moreover, in the case a fine particle component is used together with the small particle aggregate component, for example, with the calcium carbonate, the aluminum hydroxide, or the like as mentioned above, as a part of the fine particle component, a component for the tone adjustment, such as a manganese dioxide, a titanium dioxide, a zirconium silicate, and an iron oxide, a luminous material such as a strontium aluminate, an inorganic fluorescent material of various kinds of oxides for providing a nocturnal property and a fluorescent property can be added.

By including the luminous material, a man-made stone having a nocturnal property (light emission) in a dark visual field, for example, at night can be provided so as to serve for an appearance or an external design property unique as a guide for guidance and display, or a nighttime decoration.

The luminous material can be contained up to 40% by weight with respect to the man-made stone total amount. Furthermore, the luminous material such as a strontium aluminate can be included also as a part of the above-mentioned inorganic fine particle component.

Since a light function can be provided by including the luminous material, a flame resistance man-made stone according to the present invention can be provided with a higher function.

In the case the transparent small particle aggregate component is covered, it is realized by covering the surface of the transparent small particle aggregate component with a resin and curing, or covering the same with an inorganic substance such as a water glass, and a glaze for pottery and baking. In either case, covering can be applied on the surface of particles of the transparent small particle aggregate component by several $\mu$m to several tens of $\mu$m, for example, 5 to 50 $\mu$m, preferably about 20 to 30 $\mu$m. More specifically, for example, by using an acrylic based resin, an unsaturated polyester based resin composition, heating the same to about 100 to 300° C., or directing a light beam for covering the particle surface of the small particle component with the resin composition and curing, or by sing a water glass, a glaze, or the like, and baking at a high temperature of about 800 to 1,100° C., the inorganic covering can be applied.

The color of the composite material product can be controlled by the covering layer of the small particle aggregate material and the tone of the resin component. Furthermore, the color can be provided with a depth and gloss according to the existence of the transparent quartz based small particle aggregate component.

For example, in the case of providing a baking layer of a water glass containing a white pigment, or a curing layer of a polyester based unsaturated resin as the covering layer, wherein a polyester based unsaturated resin is used as the resin component, since the color of a resin, in general, is white with a slight yellowish tinge, the product to be obtained becomes opaque with gloss, and thus a product with a tone similar to a natural opaque marble can be obtained.

By providing a covering layer containing a coloring material such as a dye, a unique tone with a depth and gloss can be provided.

In the present invention, as a color component, particles with a color having the substantially same size as the small particle component can be mixed therewith and used for providing a color to the product.

Anyway, the color reproductivity can be ensured further easily compared with the conventional man-made stones so that those having the excellent depth and gloss, without discoloration can be obtained.

Moreover, in the present invention, it is particularly effective to apply a glaze for coloring a pottery, or the like, to a powdery material of a natural transparent small particle aggregate component, bake the same for obtaining a powdery substance of a desired color, and use the same as the small particle aggregate component. By using this method, the color can be provided certainly as well as it can be selected from a wider range.

By using the same quartz based natural stone pulverized as the small particle aggregate component, and applying a glaze thereto and baking, in the case of a black or red color, there is no concern about the color reproductivity at all. The color to be reproduced can be provided completely for not only the color itself but also the gloss and tone.

These coverings dramatically improve the affinity of the small particle aggregate component serving as the aggregate of the man-made stone with respect to the entire structure. Moreover, by mixing the fine particle component and the resin component, the strength can be higher as well as the surface hardness can be preferable.

Further importantly, since a transparent natural stone, or the like is used for the small particle aggregate component as mentioned above, and the above-mentioned hard covering is applied on the surface thereof, by polishing the surface of the man-made stone product, the covering layer is partially broken. Therefore, according to the partially exposed inorganic transparent small particle component particles and the covering layer surface structure in the vicinity thereof, a unique effect can be obtained in terms of the reflection of a light.

That is, a light is incident on the transparent small particle aggregate component, reflected by the covering layer in the vicinity thereof, and passes through the transparent small particle aggregate component again so as to be reflected. Such a light phenomenon of the light transmission and reflection essentially differs from the reflection only on the surface of the conventional man-made stone. This provides a unique depth feeling to the composite material according to the present invention. Therefore, a high quality marble-like composite material with a grave depth can be obtained.

The transparent small particle aggregate component having the covering layer as mentioned above can be provided, in general, by a ratio of 10 to 100% with respect to the total amount of the inorganic small particle aggregate component as mentioned above.

Next, the resin component as one of the main components comprising the resin-inorganic composite material according tot he present invention will further be explained.

In general, in the present invention, the resin component can be selected from those with a thermosetting property.

Examples thereof include an acrylic based resin, a methacrylic based resin, an unsaturated polyester based resin, and an epoxy based resin. Among these examples, a methacrylic based resin, a mixture of a methacrylic based resin, and a copolymer resin thereof are particularly preferable.

The resin component may contain a curing (catalyst) agent, an azo based or phthalocyanine based organic pigment or dye for the tone adjustment.

As mentioned above, the resin component does not exceed 40% by weight with respect to the total amount of the composite material of the present invention. The ratio thereof is, more preferably 20% by weight or less, further preferably 15% by weight or less.

The resin component is considered more preferably as a component for providing a hard resin, and a component for softening the hard resin, or a combination with a component for providing a soft resin. Also in this case, it is indispensable that these components should be cured integrally without separation.

They are selected preferably as components of the same kind and series. Examples thereof include a methyl methacrylate resin component and a 2-ethylhexyl methacrylate resin component.

Moreover, in view of the excellent transparency, it is preferable to adopt a methacrylic based resin. Examples thereof include the following formula:

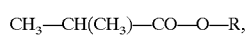

(wherein R is a straight chain or branched chain aliphatic hydrocarbon group, a cyclic hydrocarbon group, or the like).

In the case of the above-mentioned methacrylic based resin, it is preferable to add a polymethacrylate and a methacrylate monomer and cure. Further preferably, in the case of using a methacylic based resin as the composite material resin component, the following composition is conceivable. The ratio is based on 100 parts by weight of a (1) methyl methacrylate monomer (MMA).

(1) methyl methacrylate polymer (PMMA) 0 to 50
(2) methyl methacrylate monomer (MMA) 100
(3) alkyl methacylate monomer, or alkyl acrylate monomer 300 or less
(4) plasticizer 0 to 300

Here, as the (3) alkyl methacrylate or alkyl acrylate, for example, a 2-ethylhexyl methacrylate, a 2-ethylhexyl acrylate, a 2-ethylpentyl methacrylate, a 2-ethylpentyl acrylate, a butyl methacrylate, a butyl acrylate, an isobutylmethacrylate, an isobutyl acrylate, a cyclohexyl methacrylate, a cyclohexyl acrylate, or the like can be presented.

Among these examples, a 2-ethylhexyl acrylate is preferable.

As the plasticizer, for example, an ester phthalate, or the like can be presented.

Moreover, in the resin-inorganic composite material according to the present invention, not only the pigment, or the like, a short fiber component may be included for reinforcing the structure in consideration of the tone. For example, a glass fiber, a ceramic fiber, a metal fiber, a resin fiber, or the like, can be used. Among these examples, the glass fiber can be used preferably.

These short fibers of, in general, about a 10 to 100 $\mu$m diameter and a 1 to 100 mm length can be used by a ratio of 1 to 10% by weight with respect to the small particle component.

Furthermore, a flame retarder may be included. As the flame retarder, an inorganic flame retarder of an antimony based, a boron based compound, or the like, or an organic based flame retarder of a bromine based compound, or the like can be presented. More preferably, an organic based flame retarder can be used. In particular, a bromine based flame retarder can be presented as a highly effective one. Examples thereof include compounds with a bromine bonded with an aromatic compound, such as a phenol, a diphenyl ether, a bisphenol A, and a benzyl alcohol, compounds of an ester, an ether, a polyester, or the like thereof, polymers and oligomers such as an acrylate bromate, an epoxy acrylate bromate, a carbonate bromate, or the like.

More specifically, for example, a brom denatured epoxy acrylate resin can be presented.

In the present invention, inclusion of the flame retarder can be realized as an configuration of a flame resistant man-made stone in an embodiment of: inclusion in the above-mentioned high density man-made stone composition; dispersion mixture of the flame retarder to a resin, and lamination and integration of a resin layer comprising the mixture with the above-mentioned high density man-made stone composition (compact).

Furthermore, in the present invention, in the case of considering application for a furniture material, a bathroom material, a kitchen counter, a toilet stool, or the like, an antibacterial agent may be included. As the antibacterial agent, for example, various inorganic substances such as a silver, a silver oxide, a zeolite, and a silver supporting zeolite can be used. The amount thereof can be, in general, 5% by weight or less with respect to the composite material total amount.

Furthermore, according to the composite material of the present invention, a transparent inorganic component can be used as at least a part of the above-mentioned small particle aggregate component as well as a nocturnal or fluorescent substance can be used as at least a part of the fine particle component.

The small particle component as the transparent inorganic aggregate denotes an inorganic component having a substantially large light transmissivity. The transparency thereof includes various degrees. Those having a relatively large light transmissivity among natural or artificially synthesized inorganic substances can be used in the present invention. Therefore, the transparent inorganic small particle aggregate component may be in a colored state or in a state having an inherent color.

As representative examples of the transparent inorganic small particle component in the present invention, a quartz, a silica rock, a glass, or the like can be presented, but it is not limited thereto.

Moreover, as a part or the entirety of the fine particle component, use a nocturnal or fluorescent component under 100 mesh, having a light emission property according to the luminous property or the ultraviolet ray absorption can be considered. As representative examples of such a component, a strontium aluminate based luminous material, a zinc sulfide, or the like, can be presented. These various materials are used in the present invention.

As to the relationship among the small particle component weight ($W_1$), the fine particle component weight ($W_2$), and the nocturnal or fluorescent component weight ($W_3$), for example, $W_1/(W_2+W_3)$ can be 1/10 to 10 times or more. More preferably, it is about 1/1 to 4/1.

As to the ratio of the inorganic fine particle component and the nocturnal or fluorescent component, the latter may be the entirety, or the inorganic fine particle component may have a ratio of 10 times by weight or more.

Moreover, as to the inorganic small particle component, the ratio of the transparent inorganic small particle component therein preferably has a relationship of $W_3=(0.3$ to $1.0)\times W_1$.

The above-mentioned conditions are considered to be appropriate for realization of the physical properties in a man-made stone, such as the strength, the hardness, and the density, and a nocturnal or fluorescent light function.

The size of each component is optionally selected specifically according to the size and the ratio of each component to be combined. The fine particle component is preferably, in general, about 150 to 250 mesh.

The light function of the man-made stone will be explained further. In the man-made stone according to the present invention, the light function can be enabled with the light emission having a thickness. Unlike the conventional light emission only on the surface layer part, the light emission can be realized in the entire thickness of the man-made stone so that the excellent light emission performance can be provided as well as the excellent economical performance can be achieved in view of use of an expensive nocturnal or fluorescent component.

This is because a high luminous intensity can be maintained over a long time according to the use of the transparent inorganic small particle component as the transparent aggregate by transmitting and permeating a light directed from the outside to the inside of the man-made stone so that the light energy is absorbed efficiently by the nocturnal or fluorescent component as well as the light emission layer with the nocturnal or fluorescent component made of a luminous material, or the like dispersed, is provided with a large thickness including the inside of the man-made stone. At the time of light emission, since the transparent inorganic small particle aggregate component has a high luminous intensity owing to the good light transmissivity.

The ratio of the transparent component in the entire small particle aggregate component is 30 to 100% by weight as mentioned above. Naturally the 100% ratio is preferable from the viewpoint of the light function, depending on the physical performance of the man-made stone, such as the strength, and the external appearance design of course it is not limited thereto, but in the case of a less than 30% ratio, a desired light function can hardly be obtained.

In the case the transparent inorganic aggregate treated with surface baking by a nocturnal or fluorescent substance is used as a part of the inorganic aggregate, as to the small particle component, in the present invention, one having a transparency at least in a part thereof, with a nocturnal substance having, for example, a luminous material or a fluorescent substance having a light emission property according to the ultraviolet ray absorption baked thereon can be used. That is, a part or the entirety of the small particle component is provided as the transparent inorganic aggregate with the surface thereof covered with a nocturnal substance or a fluorescent substance. As preferable examples of the small particle component as such an inorganic aggregate having a transparency, a glass, a silica rock, or the like, can be presented.

As to the small particle component to be included in the composition, it is preferable that a 10 to 100% ratio (by weight) thereof is the above-mentioned transparent inorganic aggregate having the surface covering layer of the nocturnal substance or the fluorescent substance.

In the baking and covering operation for the transparent inorganic aggregate, particularly, the small particle aggregate component, the particle surface of the transparent small particle component is covered by several $\mu$m to several tens of $\mu$m, for example, 5 to 50 $\mu$m, preferably about 20 to 40 $\mu$m. More specifically, the covering can be applied by baking at a high temperature of about 120 to 1,200° C.

As the fluorescent substance to be baked, various fluorescent substances having a luminous property or a light emission property by the ultraviolet ray irradiation, such as a strontium aluminate, and a zinc sulfide can be used.

For the baking operation, a method other than the conventionally known various methods can be adopted. For example, the transparent inorganic aggregate, such as the above-mentioned small particle component can be mixed in a dispersion liquid with particles of the luminous material, such as a strontium aluminate, or a paste, dried, and baked.

The resin-inorganic composite material according to the present invention, having a high hardness on the surface, a softness, a depth and a high class feeling, has the above-mentioned composition and configuration. The shape thereof may be selected optionally, such as a plate-like, and a designed special shape.

The composite material according to the present invention can be produced, for example, by the following method.

As a representative production method, a method of injecting a molding mixture of the inorganic component, the resin component, or the like into a mold, followed by natural curing, a method of placing an upper mold after injection, press curing, and releasing the mold, and a method of producing by applying the roughing treatment by polishing, water jet, or the like as needed, can be presented.

In the case of curing by heating and compressing with the upper mold placed, the compression is carried out by pressing with a surface pressure of about 5 to 100 kgf/cm$^2$. In the molding operation, heat is applied to about 90 to 140° C. for 5 to 20 minutes at the time of compression.

The method of compression molding enables the mass production effect as a molding method for a relatively simple shape like a flat plate compact. Moreover, since there is hardly a material loss, the excellent economical property can be realized as well.

The means for the surface polish is not particularly limited. It is carried out by using a tool such as a grinding stone, a polishing cloth, and a polishing belt, or by using a polishing agent such as a buff polishing agent, and a rubbing compound.

As the polishing material, those mainly having a polishing effect, such as a diamond, a boron carbonate, a corundum, an alumina, and a zirconia, or those mainly having a polishing effect, such as a tripoli, a dolomite, an alumina, a chromium oxide, and a cerium oxide, can be used optionally.

In the present invention, it is possible to apply the roughing process on the compact surface after molding so as to expose the fine particle component on the surface.

As the method therefor, first, a selective elimination method for the resin component is adopted. That is, it is effective to apply, for example, the base surface process by jetting high pressure water on the compact surface after releasing from the mold.

The process varies depending upon the conditions such as the thickness, the distance with respect to the nozzle, the process embodiment, and thus it cannot be limited, but in general, in the case of a 2 to 20 cm thickness, about a 50 to 1,400 $kg/cm^2$ water pressure can be adopted in the case of about a 2 to 50 cm nozzle height. The pressure is a lower water pressure condition compared with the case for a natural stone.

That is, owing to the existence of the resin component, a process can be achieved further easily with a high quality.

The nozzle for jetting high pressure water and a system thereof are not particularly limited. Various forms can be adopted.

According to the base surface process, the flatness or the roughing can be realized by water jetting so that a composite material with a deep feeling can be produced.

Owing to the existence of the resin component, the surface cannot be opaque as well as the waste liquid process can be facilitated compared with the case of an etching method using a chemical of course, as needed, it is also possible to treat the surface part with an organic solvent for softening or melting the resin component for partial elimination.

In this case, the organic solvent can be selected corresponding to the resin component to be used. Examples thereof include hydrocarbon halides such as a methylene chloride, and a chloroform, carboxylic acids such as an acetic anhydride, an ethylacetate, and a butyl acetate, or ester compounds thereof, an acetone, a tetrahydro furan, a DMF, and a DMSO.

The surface ruggedness can be formed by soaking the compact in such an organic solvent, spraying or running the organic solvent, and eliminating the softened or melted resin component from the surface part.

Furthermore, the ruggedness may be formed by scraping off the resin component with a low hardness from the surface part by a wire brush, a cutting, means, or the like.

After applying the roughing and base surface process by the above-mentioned means, by polishing the surface as mentioned above, the surface feeling with a unique depth and gloss can be realized.

For example, in either of the above-mentioned method, in the case of using the transparent inorganic aggregate with the surface covered with the nocturnal or fluorescent substance as the resin molding mixture, the cross-section of the particles and the covering layer is exposed by the treatment of polishing, or the like.

Also by the process, a composite material having the excellent light emission characteristic, and the excellent texture and feeling can be obtained.

Moreover, since the organic, inorganic composite material according to the present invention has a high surface hardness as mentioned above, even in the case of a thin plate, the excellent wear resistance and damage resistance can be provided. Furthermore, since it is soft, the excellent compatibility with respect to the base surface can be provided. Besides, the characteristics of an artificial stone material having a depth and a high class feeling can be provided. Therefore, it is extremely preferable for the application as a floor material, or a passage material, and the application for a pillar, or the like.

Hereinafter, the composite material according to the present invention will be explained in further detail with reference to examples.

EXAMPLES

Example 1

An inorganic component was prepared using a small particle aggregate component of a natural silica rock of a 10 to 25 mesh particle size, and a fine particle component of an aluminum hydroxide of a 230 mesh average particle size, with the small particle aggregate component/fine particle component weight ratio of 2/1.

With 80% by weight of the inorganic component with respect to the total amount, and 20% by weight of a resin component according to the configuration of the table 1, a composite material composition was prepared.

The composition was placed into a mold, and applied with a 20 $kgf/cm^2$ pressure at about 110° C. for the compression molding so as to obtain a 5 mm thickness plate-like member.

The water absorption ratio, wear resistance, bending tests were executed therefor according to the standard of the JIS A 5209 (pottery tile). Moreover, the Vickers hardness was measured according to the JIS Z 2244 standard. Results are shown in the table 2.

Moreover, the obtained composite material was formed into a platy body having a 5 mm thickness, and a 30 mm width as shown in FIG. 1. With both ends of a 80 mm length distance supported, the upper part longer surface was pressured for measuring the limit deflection amount (δ) and the limit pressure (P) until breakage. Results are shown also in the table 2.

As to the limit deflection amount of the example of the composite material according to the present invention can be characterized, in general, as follows.

That is, it is characterized as a plate-like member having a 5 mm thickness, and a 30 mm width having a 2 mm or more limit deflection amount in the case it is pressured by 1 kgf with both ends of a 80 mm length distance supported. Furthermore, the limit deflection amount is 5 mm or more.

The radius of curvature capable of applying a bending work without breakage was measured for the above-mentioned composite material. It was confirmed to be R200 mm. Moreover, the force needed for the bending work was 0.05 $kgf/cm^2$.

It was confirmed to have a high surface hardness as well as a softness. Furthermore, it was also confirmed as a composite material having a natural stone-like depth and a high class feeling.

Example 2

In the same process as the example 1 except that the inorganic component ratio was 88% by weight with respect to the total amount, and the resin component ratio was 12% by weight, a composite material similar to that of the example 1 was obtained.

Results of the performance tests thereof are shown in the table 2. Moreover, the composite material can be bonded with an R500 mm concrete pillar with an elastic epoxy resin without breakage.

Similar to the example 1, it was confirmed to have a high surface hardness as well as a softness. Furthermore, it has an external appearance with a depth and a high class feeling.

duced by molding an unsaturated polyester resin, a pigment, and a stone powder. Results are shown in the table 2.

It was confirmed that the surface hardness is extremely low. Moreover, they have the externally appearance to be recognized as a plastic plate at one glance.

TABLE 1

| | Resin Component Ratio (part by weight) | | | | | | | |
|---|---|---|---|---|---|---|---|---|
| | Example | | | | | | Comparative Example | |
| Test No. | 1 | 2 | 3 | 4 | 5 | 6 | 1 | 2 |
| polymethyl methacrylate (PMMA) | 30 | 30 | 30 | 25 | 25 | 25 | 0 | 50 |
| methyl methacrylate (MMA) | 100 | 100 | 100 | 100 | 100 | 100 | 100 | 100 |
| 2-ethylhexyl methacrylate | 100 | 100 | 200 | 0 | 0 | 20 | 0 | 0 |
| 2-ethylhexyl acrylate | 0 | 0 | 0 | 0 | 200 | 100 | 0 | 0 |
| cyclohexyl methacrylate | 0 | 0 | 0 | 100 | 0 | 0 | 0 | 0 |
| Plasticizer | 100 | 200 | 300 | 100 | 200 | 100 | 0 | 0 |

(Note)
1. Plasticizer: dioctyl phthalate
2. peroxide based polymerization initiator included by 5 parts by weight

TABLE 2

| | Example | | | | | | Comparative Example | | | |
|---|---|---|---|---|---|---|---|---|---|---|
| Test No. | 1 | 2 | 3 | 4 | 5 | 6 | 1 | 2 | 3 | 4 |
| Vickers hardness (Hv) | 1265 | 1268 | 1240 | 1243 | 1210 | 1270 | 1635 | 1630 | 473 | 480 |
| water absorption ratio (%) | 0 | 0 | 0 | 0 | 0 | 0 | 0 | 0 | 0.8 | 0.9 |
| wear resistance (g) | 0.02 | 0.02 | 0.03 | 0.03 | 0.03 | 0.02 | 0.02 | 0.02 | 0.03 | 0.03 |
| bending test (kgf/cm$^2$) | 4.10 | 4.05 | 4.03 | 4.03 | 4.05 | 4.15 | 9.49 | 9.50 | 4.69 | 5.50 |
| limit deflection amount: a (mn) | 7.0 | 7.0 | 7.3 | 7.0 | 7.1 | 6.9 | 0.5 | 0.4 | 6.3 | 6.0 |
| limit pressure: P (kgf) | 1 | 1 | 1 | 1 | 1 | 1 | 24 | 25 | 5 | 8 |

Examples 3 to 6

In the same process as in the example 1 with the resin component configuration as shown in the table 1, composite materials were obtained.

Results of the performance tests thereof are shown in the table 2.

In either case, a high hardness surface and a good softness performance were obtained. Furthermore, an external appearance with a depth and a high class feeling was obtained.

Comparative Examples 1 to 2

In the same process as in the example 1 except that with the resin component configuration as shown in the table 1 without using a 2-ethylhexyl methacrylate, composite materials were obtained. Results of the performance tests thereof are shown in the table 2.

Although a high surface hardness was obtained, a softness performance was not obtained.

Comparative Examples 3 to 4

The performance tests were executed also for commercially available man-made stone materials (2 kinds) pro- As heretofore explained in detail, according to the present invention, an organic-inorganic composite material having a high surface hardness so as to provide the excellent wear resistance and damage resistance even if it is provided as a thin plate, a softness so as to provided the excellent compatibility with respect to the base surface, and a depth and a high class feeling as an artificial stone material so as to be provided excellently for the application for a floor material, and a passage material, or the application for a pillar, or the like, can be provided.

What is claimed is:
1. A high hardness, soft composite material which consists of an organic/inorganic composite material comprising
    at least 60% by weight of inorganic components including an aggregate component of 2 to 70 mesh and a fine particle component of 100 mesh or smaller in a weight ratio of the aggregate component to the fine particle component of 1/10 to 10/1, wherein at least a part of the aggregate component is a transparent component with a surface covered with a pigment component, and 40% by weight or less of organic components,
    wherein the composite material has a surface Vickers hardness, measured according to JIS Z 2244, of at least

400 and a radius of curvature R, at which the material is bendable without being broken, of 25–1,000 mm based on a plate-shaped body having a 3 to 15 mm thickness.

2. The composite material according to claim 1, wherein the main component of the organic component is a curing resin.

3. The composite material according to claim 2, wherein the main component resin of the organic component is a methacrylate resin.

4. The composite material according to claim 2, wherein the organic component contains a plasticizer.

5. The composite material according to claim 2, wherein the resin is contained by 6 to 15% by weight with respect to the total amount.

6. The composite material according to claim 1, wherein a luminous material or a fluorescent material is contained.

7. The composite material according to claim 1, wherein a flame retarder is contained.

8. The composite material according to claim 1, wherein a pigment for coloring is contained in the organic component.

9. The composite material according to claim 1, wherein an antibacterial agent is contained.

10. The composite material according to claim 1, wherein the surface of a compact is treated by polishing, a water jet process, or a water jet process after polishing.

11. The composite material according to claim 1, wherein the main component of the organic component is a methacrylate resin, to be cured by a combination of a polymethacrylate and at least one member selected from the group consisting of a methacrylate monomer, and an acrylate monomer.

12. The composite material according to claim 11, wherein the polymethacrylate is a polymethyl methacrylate, the methacrylate monomer and the acrylate monomer is one selected from the group consisting of a methyl methacrylate, an ethylhexyl methacrylate, and an ethylhexyl acrylate.

13. The composite material according to claim 1, wherein a force needed for a bending process of a plate-shaped body having a 3 to 15 mm thickness is 1 kgf/cm$^2$ or less.

14. The composite material according to claim 1, wherein the aggregate component is at least one member selected from the group consisting of metal, natural stone and ore.

15. The composite material according to claim 1, wherein the aggregate component is at least one member selected from the group consisting of granite aggregate, marble aggregate, metamorphic rock aggregate, quartz aggregate, feldspar aggregate, mica aggregate, molten silica aggregate, glass aggregate, metal aggregate and pottery aggregate.

16. A high hardness, soft composite material which consists of an organic/inorganic composite material comprising at least 60% by weight of inorganic components including an aggregate component of 2 to 70 mesh and a fine particle component of 100 mesh or smaller in a weight ratio of the aggregate component to the fine particle component of 1/10 to 10/1, wherein the fine particle component includes a luminous material or a fluorescent material, and 40% by weight or less of organic components, wherein the composite material has a surface Vickers hardness, measured according to JIS Z 2244, of at least 400 and a radius of curvature R, at which the material is bendable without being broken, of 25–1,000 mm based on a plate-shaped body having a 3 to 15 mm thickness.

* * * * *